(12) United States Patent
Drazic et al.

(10) Patent No.: US 8,231,228 B2
(45) Date of Patent: Jul. 31, 2012

(54) PROJECTION IMAGE DISPLAY DEVICE HAVING TWO MODULATION STAGES, INCLUDING ONE APERTURE MODULATION STAGE

(75) Inventors: Valter Drazic, Betton (FR); Khaled Sarayeddine, Nouvoitou (FR)

(73) Assignee: Thomson Licensing, Boulogne-Billancourt (FR)

( * ) Notice: Subject to any disclaimer, the term of this patent is extended or adjusted under 35 U.S.C. 154(b) by 399 days.

(21) Appl. No.: 12/448,029

(22) PCT Filed: Dec. 6, 2007

(86) PCT No.: PCT/EP2007/063478
§ 371 (c)(1),
(2), (4) Date: Jun. 4, 2009

(87) PCT Pub. No.: WO2008/068321
PCT Pub. Date: Jun. 12, 2008

(65) Prior Publication Data
US 2009/0303445 A1 Dec. 10, 2009

(30) Foreign Application Priority Data
Dec. 7, 2006 (FR) ..................................... 06 55382

(51) Int. Cl.
*G03B 21/14* (2006.01)
(52) U.S. Cl. .......... 353/38; 359/621; 359/622; 359/623; 359/624

(58) Field of Classification Search .................... 353/38, 353/88, 89, 90, 91, 92, 93, 97; 349/5, 6, 349/7, 8, 9, 18, 193; 355/71, 67; 359/621, 359/622, 623, 624
See application file for complete search history.

(56) References Cited

U.S. PATENT DOCUMENTS
| | | | | |
|---|---|---|---|---|
| 5,083,854 A | * | 1/1992 | Zampolin et al. | 349/5 |
| 5,583,669 A | * | 12/1996 | Fushimi et al. | 349/5 |
| 6,637,892 B1 | * | 10/2003 | Okuyama et al. | 353/38 |
| 2003/0086265 A1 | | 5/2003 | Ilsaka et al. | |

FOREIGN PATENT DOCUMENTS
EP 1398973 3/2004
WO WO 2004/064410 7/2004

OTHER PUBLICATIONS
Search Report Dated Mar. 20, 2008.

* cited by examiner

*Primary Examiner* — Francis M Legasse, Jr.
*Assistant Examiner* — Bao-Luan Le
(74) *Attorney, Agent, or Firm* — Tutunjian & Bitetto, P.C.

(57) ABSTRACT

A method for illuminating the surface of an object by using a source beam is provided. The source beam is partitioned into as many illumination sub-beams as there are surface elements to be illuminated, and their aperture is modulated as a function of the predetermined luminous intensity to be assigned to the surface element. Each surface element is illuminated with the aid of one of said illumination sub-beams. Used for illuminating the imagers of projection devices, this method makes it possible to add a second modulation stage allowing the display contrast of the images to be improved.

7 Claims, 4 Drawing Sheets

PROJECTION IMAGE DISPLAY DEVICE HAVING TWO MODULATION STAGES, INCLUDING ONE APERTURE MODULATION STAGE

This application claims the benefit, under 35 U.S.C. §365 of International Application PCT/EP2007/063478, filed Dec. 6, 2007, which was published in accordance with PCT Article 21(2) on Jun. 12, 2008 in French and which claims the benefit of French patent application No. 0655382, filed Dec. 7, 2006.

The invention relates to a modulable optical illumination device which, in particular, may be used in a projection device for displaying images; projection devices generally comprise an illumination device, at least one imager adapted to be illuminated by this illumination device and to generate images to be projected, and a projection objective adapted to project the images generated by the imager onto a screen; according to document U.S. Pat. No. 5,083,854, the device for illuminating the surface of the imager comprises a radiation source (ref. 20 in FIG. 1) and an optical device for modulable illumination of this imager. Here, the modulable optical illumination device comprises a first and a second array of microlenses (ref. 40, 42 in FIG. 1; ref. 52, 56 in FIG. 2), and an array of elementary light modulators (ref. 38 in FIG. 1; ref. 54 in FIG. 2) interposed between the two arrays of microlenses; by using the radiation emitted by the source, this modulable optical illumination device is adapted to form a plurality of illumination sub-beams, and each illumination sub-beam is adapted to illuminate a different surface element of the imager. Each image projected onto the projection screen is then generated not only by the spatial modulation provided by the imager itself, but also upstream by the illumination modulation of the sub-beams themselves by virtue of the elementary light modulators of the optical illumination device. Since two levels of spatial modulation are then available in cascade, the display contrast of the images can therefore be improved very substantially (HDR or "high dynamic range"). Document U.S. Pat. No. 6,947,025 presents an analog projection device for displaying images, in which the first modulation stage, also interposed between two arrays of microlenses, is formed by an array of microshutters.

The documents cited above therefore describe a method for displaying images with the aid of an imager and means for imaging this imager onto a projection screen, the surface of the imager being partitioned into a plurality of surface elements, wherein each image is generated by illuminating each surface element of the imager with a predetermined luminous intensity and by spatially modulating the illumination of each surface element with the aid of this imager. It is an object of the invention to provide another solution for improving the display contrast of the images.

To this end, the invention relates to a method for illuminating the surface of an object by using a source beam, in which, said surface being partitioned into a plurality of surface elements to be illuminated with a predetermined luminous intensity:
  said source beam is partitioned into as many illumination sub-beams as there are surface elements to be illuminated,
  each surface element is illuminated with the aid of one of said illumination sub-beams,
wherein the aperture of each illumination sub-beam of a surface element is modulated as a function of the predetermined luminous intensity of this surface element.

The invention also relates to a method for displaying images with the aid of at least one imager and means for imaging the at least one imager onto a projection screen, the surface of the at least one imager being partitioned into a plurality of surface elements, in which each image is generated by illuminating each surface element of the at least one imager with a predetermined intensity and by spatially modulating the illumination of each surface element with the aid of the at least one imager, wherein each surface element of the at least one imager is illuminated by illuminating the surface of said imager according to the illumination method of the invention, the object to be illuminated therefore being the imager.

The invention also relates to a device for illuminating the surface of an object, capable of carrying out the modulable illumination method according to the invention, comprising a source adapted to emit a source beam, a first array of microlenses intercepting said source beam and adapted to partition said source beam into a plurality of illumination sub-beams, and a second and a third array of microlenses, wherein:
  said second array of microlenses is adapted so that each of its microlenses images a microlens of the first array onto a microlens of the third array, these three microlenses thus being associated,
  the distance between said first array of microlenses and said second array of microlenses is equal to the focal length of the microlenses of the first array of microlenses,
  the distance between said second array of microlenses and said third array of microlenses is equal to the focal length of the microlenses of the third array of microlenses,
and wherein said device also comprises:
  an array of microdiaphragms with a modulable aperture, each microdiaphragm of this array being centered on the optical axis of a group of three associated microlenses and positioned in proximity to the microlens of the second array of this group,
  an optical relay system which is arranged between the third array of microlenses and the object to be illuminated, and which is adapted to image each of the microlenses of the third array onto a different surface elements of said object.

In general, all the microlenses of the first array have the same focal length, all the microlenses of the second array have the same focal length and all the microlenses of the third array have the same focal length.

Preferably, the focal length of the microlenses of the first array is equal to the focal length of the microlenses of the third array; if f is the focal length common to the microlenses of the first array and the third array, then the focal length of the microlenses of the second array will be f/2. All the microlenses are then of the converging type.

The arrays of microlenses are produced in a manner known per se, taking into account the number of illumination sub-beams in the plurality; a single piece, for example molded or thermoformed, may combine two successive arrays (one array at each end), as described in document U.S. Pat. No. 5,098,184.

Each microlens of the first array, which intercepts the source beam, therefore defines an illumination sub-beam; the first array of microlenses is therefore used to sample the source beam. The optical illumination device according to the invention is therefore adapted to sample a source beam.

Each microlens of the second array forms, for the group of microlenses associated with this microlens, the pupil of this group and delimits the maximum aperture of the illumination sub-beam associated with this group, at least if the aperture is not otherwise limited by that of the source beam. According to the invention, a microdiaphragm is therefore centered on the optical axis of this group and positioned in proximity to the microlens of the second array of this group. Thus, each microdiaphragm is positioned approximately on the entry pupil of the group formed by these three microlenses for the illumination sub-beam associated with this group. Since the aperture of this microdiaphragm is moreover modulable, the aperture of the illumination sub-beam associated with this group can thus be varied.

The function of the microlenses of the third array is to ensure telecentricity of each group of three associated microlenses. Thus when the object to be illuminated is an imager, since the incidence of the "chief rays" on the imager is constant, the spatial modulation ensured by the imager is provided homogeneously over the entire surface of the imager, for each surface element of this imager. If the illumination of each surface element of the imager were not telecentric and, for example, if the imager were of the type with liquid-crystal optical valves (LCD), which as is known have modulation characteristics that depend broadly on the angle of incidence of their illumination, then interfering spatial modulation fluctuations would be obtained. Thus by virtue of the arrangement of the three arrays of microlenses according to the invention, for any illumination sub-beam which is defined by the portion of the source beam that is intercepted by a microlens of the first array and emerges from the third array's microlens associated therewith, this illumination sub-beam will be refracted by this microlens of the first array so that its principal axis passes through the center of the second array's microlens which is associated with this microlens of the first array.

The array which comprises a plurality of microdiaphragms with a modulable aperture may be formed by an array of groups of liquid-crystal optical valves, in which each group corresponds to one microdiaphragm with a modulable aperture; within each microdiaphragm, the optical valves are then distributed in a plurality of concentric rings (the rings are, for example, square) around a central optical valve; when only the central valve is open, all the others being closed, the minimum aperture is obtained; when all the valves are open, the maximum aperture is obtained; when the valves of the smaller rings are open while the valves of the larger rings are closed, an intermediate aperture is obtained.

As already mentioned above, the maximum accessible aperture of each illumination sub-beam is fixed by the aperture of the source beam and/or by the size of the second array's microlens through which this sub-beam passes. By virtue of the array of microdiaphragms with a modulable aperture, the aperture of each illumination sub-beam can be modulated separately; when used to illuminate the surface of an object, the optical illumination device therefore makes it possible to illuminate each surface element of this object separately. The surface of the object is partitioned into surface elements. Each illumination sub-beam illuminates one of these surface elements; preferably, no surface element is illuminated simultaneously by more than one sub-beam. Preferably, one surface element of the object to be illuminated corresponds to each illumination sub-beam.

The optical relay system therefore images each of the microlenses of the third array onto a different surface element of the object to be illuminated. Since each microlens of the first array is moreover imaged onto a microlens of the third array by a microlens of the second array, each microlens of the first array is therefore imaged onto a different surface element of the object to be illuminated.

The optical relay system may be formed by lenses and/or mirrors; such systems are known per se, and will not be described in detail here.

In the optical illumination devices of the prior art, as described in document U.S. Pat. No. 5,098,184 (integrator of the "fly eye" type), the images of different elements of a source surface are superimposed on the surface of the object to be illuminated, while in the optical illumination device according to the invention they remain separate and are generally juxtaposed.

One specific feature of the invention is due to the array of diaphragms: since their aperture is modulable, each microdiaphragm is adapted to modulate the aperture of an illumination sub-beam of a surface element of the object, which makes it possible overall to spatially modulate the lighting of the surface of the object. This involves aperture modulation of the lighting sub-beams, as opposed to modulation of the luminance of these sub-beams as described, for example, in document U.S. Pat. No. 6,947,025 (cf. the "shading plates") or in document U.S. Pat. No. 5,083,854 where the modulator (ref. 54 in FIG. 2), which is placed at a focal point of a sub-beam, is adapted to modulate a luminous intensity transmitted by this sub-beam. When liquid-crystal optical valves are used for the array of microdiaphragms, it is furthermore possible to modulate both the aperture and the luminance of the illumination sub-beam, which allows the display contrast of the images to be improved further with only two modulation stages, as will be described in more detail below.

Preferably, if $A_S$ is the angular aperture of said source beam, if L is the height of the microlenses of the second array, and if f is the focal length of the microlenses of the first array, then the relation $L/(2.f)=\tan(A_S/2)$ is satisfied. An advantageous match is then obtained between the aperture of the source beam and the size of the microlenses of the second array, which allows the aperture of the illumination sub-beams to be modulated with maximum amplitude by collecting the maximum light flux with maximum aperture.

Preferably, said source is also adapted to provide a source surface of approximately uniform emittance, through which said source beam passes, and said first array of microlenses is arranged in proximity to said source surface.

Preferably, the source surface is formed by the first array of microlenses itself or by a surface lying upstream, very close to this array. This source surface may be formed by a panel of light-emitting diodes. Thus, when an optical relay system is associated with it, each group of microlenses images an element of this source surface onto a surface element of the object to be illuminated.

Preferably, said source comprises a lamp, an integrator provided with an entry section and an exit section, and an optical system adapted to image said lamp onto the entry section of said integrator.

The optical relay system then images each surface element of the exit section of the integrator, facing which there is a microlens of the first array, through the three arrays of microlenses onto a different surface element of the imager.

The lamp is for example an arc lamp with white-colored polychromatic emission.

As an alternative, it is possible to use an integrator of the "fly-eye" type provided with a field lens at the exit, which is capable of superimposing the multiple images of the source, in which case the source surface lies in the image plane of this integrator.

The source generally comprises a mirror capable of reflecting a part of the light flux of the lamp to the integrator: this may for example be a spherical, parabolic or elliptical mirror; likewise, the source may also comprise a condenser lens adapted to focus (in the case of a bar integrator) or collimate (in the case of a so-called "fly eye" integrator) the radiation coming from the source onto the input of the integrator.

The invention also relates to a projection device for displaying images, comprising at least one imager adapted to generate images to be projected by using the illumination of its surface, a projection objective adapted to project said images generated by the at least one imager onto a projection screen, and a modulable illumination device according to the invention adapted to illuminate the surface of said imager.

The object illuminated by the modulable illumination device is then the imager itself. This imager is adapted to spatially modulate the lighting supplied to its surface by the various illumination sub-beams, so as to form an image to be projected; it generally comprises a two-dimensional array of light modulators.

The projection device also comprises means for controlling the aperture of each of the microdiaphragms of the array of microdiaphragms, and means for controlling each of the image modulators. Generally, one pixel or one sub-pixel of the image to be displayed corresponds to each light modulator of the imager.

The modulators of the imager are, for example, liquid-crystal cells; it is then expedient for the illumination sub-beams of the imager to be polarized; the polarization may be obtained in the illumination device, for example by a polarizer arranged immediately at the exit of the integrator, or in the integrator itself; it is advantageous to recycle the polarization of the radiation reflected by the polarizer, for example via a mirror and a quarter-wave plate which may be arranged in the integrator itself, in proximity to its input; other systems for recycling polarization may be envisaged without departing from the invention.

The modulators of the imager may also be micromirrors ("DMD" or digital micromirror device), which generally requires lighting of the imager at oblique incidence; since the modulable optical illumination device is telecentric, the illumination sub-beams advantageously strike all the micromirrors or liquid-crystal cells at identical incidence, which improves the display quality of the images being projected.

A projection device is thus obtained with two modulation stages, which therefore makes it possible to improve the display contrast of the images; the first stage modulates the illumination of the surface of the imager by adapting the aperture of the illumination sub-beams of each surface element of this imager, and the second stage, formed by the imager, spatially modulates the lighting of each surface element of this imager. Each illumination sub-beam illuminates a group of valves of the imager; no group of valves is illuminated simultaneously by more than one illumination sub-beam. There is therefore a one-to-one relation between the illumination sub-beams and the groups of valves.

Preferably, the projection device comprises a lens adapted to image the exit pupils of said illumination device onto the entry pupil of said projection objective, which allows full use to be made of all the light flux delivered by the at least one imager. The projection objective is of a known type, and will not be described in detail.

Preferably, in order to allow images to be displayed in color, the projection device comprises color sequencing means. For example, a colored wheel is used whose segments are formed by filters transmitting different primary colors required for the display, generally red, green and blue; this wheel is placed so that one of its segments intercepts the source beam, for example at the input of the integrator of the illumination device; rotation of the wheel leads to the successive display of images with different primary colors which, by fusion of the colors in the eye, makes it possible to display images in color. Other color sequencing means may be used without departing from the invention.

Instead of using color sequencing means, it is also possible to use as many images as there are primary colors required for displaying the images in color; the projection device then comprises means for splitting the colors, adapted to split the illumination sub-beams into sub-beams of different primary colors and direct them to the various imagers, and means adapted to recombine the sub-beams spatially modulated by these imagers and redirect them to the input of the projection device. Such means, which are known in the prior art, generally comprise dichroic mirrors.

The invention also relates to a method for displaying images with the aid of a projection device according to the invention, in which, a plurality of sub-beams, which are adapted to illuminate different surface elements of said imager, are formed with the aid of said optical illumination device, each image to be projected is generated both by modulating the aperture of each illumination sub-beam and with the aid of this imager itself, by furthermore spatially modulating each illumination sub-beam whose aperture is modulated, and said generated images are projected with the aid of said projection objective.

The invention will be understood more clearly by reading the following description given by way of nonlimiting example and with reference to the appended figures, in which:

FIG. 1 is an overall view of the three arrays of microlenses and the array of microdiaphragms, FIG. 2 illustrates the aperture modulation of an illumination sub-beam, and FIG. 3 gives an overall perspective view of the entire illumination device.

According to a preferred embodiment of the invention, applied to a device for displaying images by projection, this display device comprises a device for illuminating the surface of an object, which is adapted to illuminate the different surface elements of this object independently of one another, an imager 7 adapted to be illuminated by said illumination device and to generate images to be projected, a projection screen and a projection objective adapted to project the images generated by the imager onto this screen.

Figure 1:
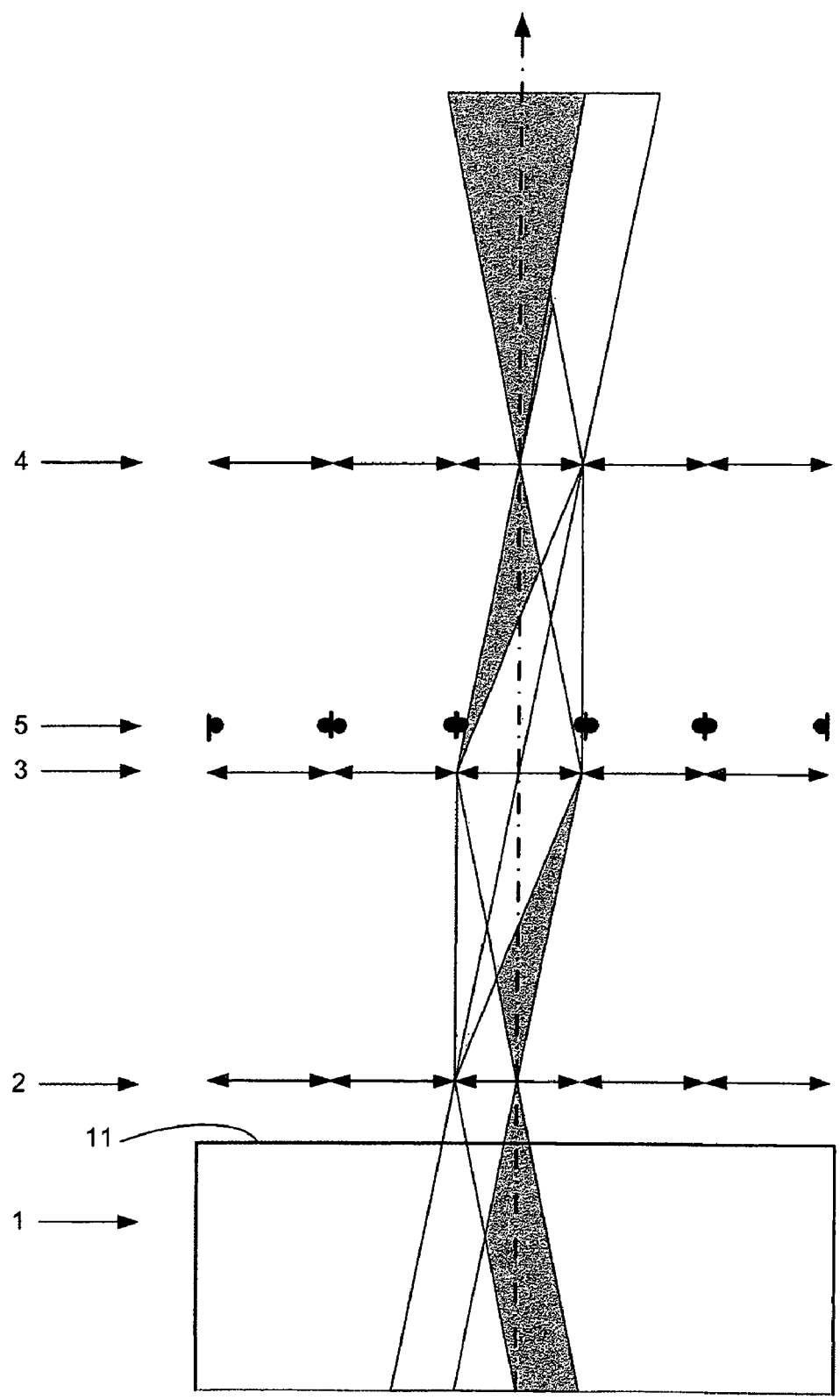
FIGS. 1 to 3 represent an optical illumination device of an imager according to one embodiment of the invention.
Figure 2:
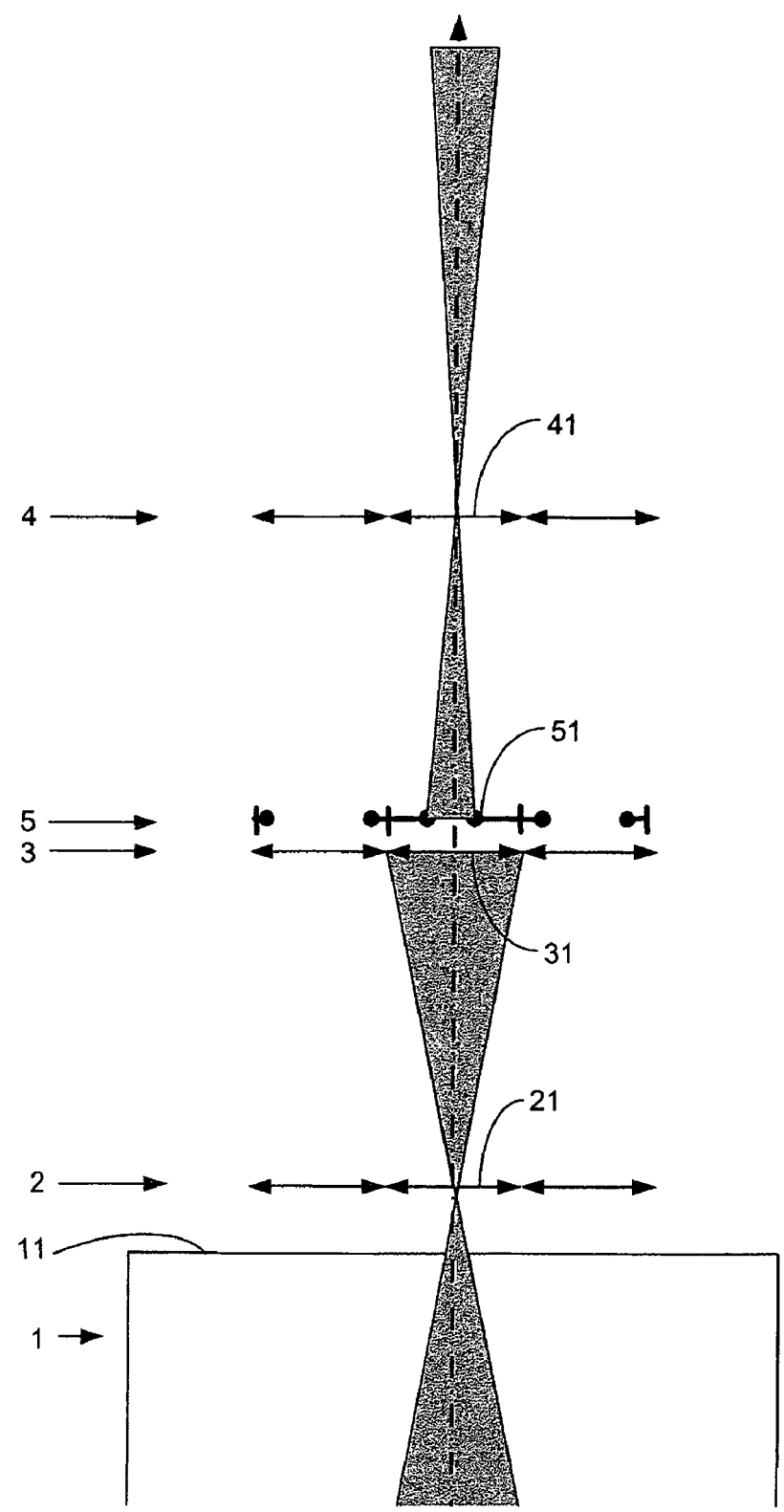
Figure 3:
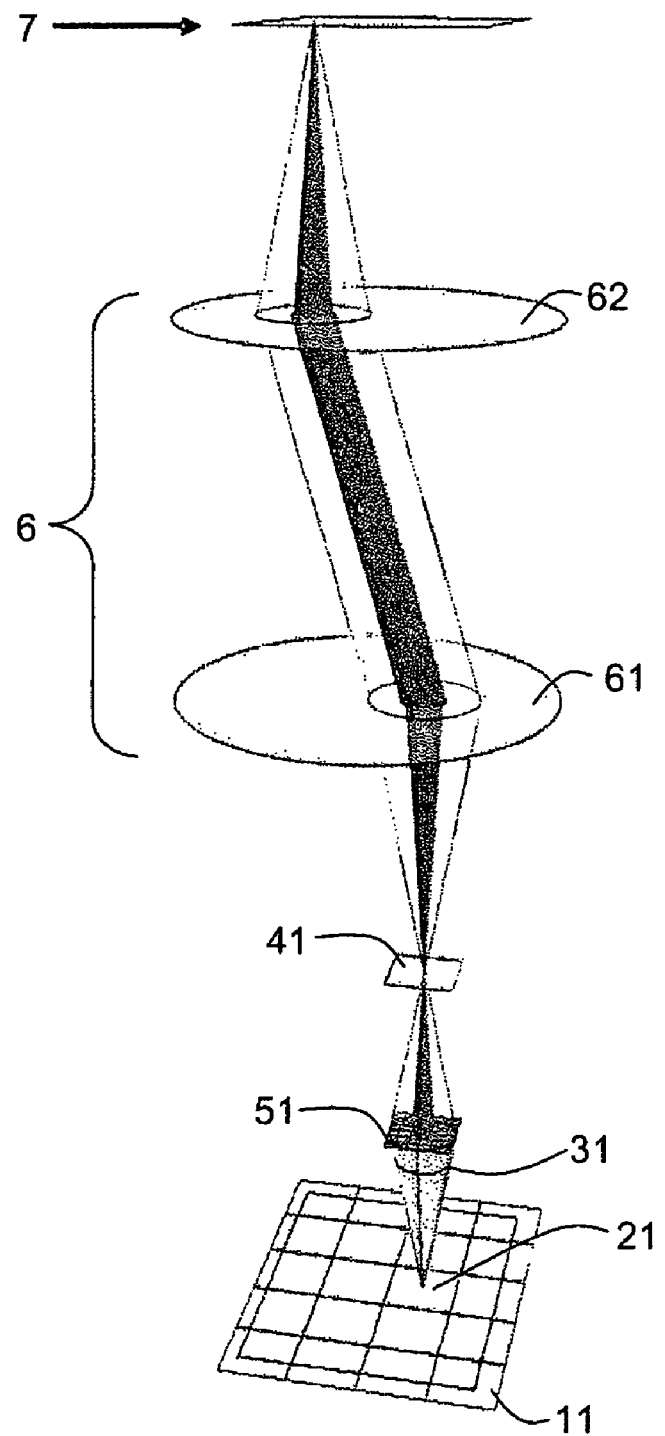

Referring to FIGS. 1 to 3, the illumination device comprises a source adapted to form a source beam. This source is adapted to form a source beam. This source preferably comprises at least one lamp (not shown), a colored wheel and an integrator of the "bar" type 1. The lamp is for example an arc lamp with white-colored polychromatic emission. The colored wheel is provided with segments formed by filters transmitting different primary colors: red, green and blue. This wheel is placed so that one of its segments intercepts the source beam at the input of the integrator 1; rotation of the wheel leads to the color of the beam being changed. By using the radiation emitted by the lamp, the "bar" type integrator is adapted to provide a source surface of approximately uniform emittance, corresponding to the exit section 11 of this integrator. The exit section of the integrator has a dimension homothetic with that of the imager's surface to be illuminated. As specified below, the illumination device is adapted to form a plurality of sub-beams for illuminating the imager 7, by using the source beam provided by the source, in which each illumination sub-beam is adapted to illuminate a different surface element of the imager 7. Furthermore, the source generally comprises an optical system adapted to image the arc of the lamp onto the input of the integrator, which generally comprises a mirror and a condenser lens (these are not shown) which are arranged between the lamp and the integrator.

According to the invention, the optical device for modulable illumination of the imager also comprises a first, a second and a third array of microlenses 2, 3, 4, an array of microdiaphragms with a modulable aperture 5, and an optical relay system 6 which is arranged between the three arrays of microlenses and the imager 7; each microdiaphragm is centered on the optical axis of a set of three associated microlenses, each of which belongs to a different array of microlenses; each microdiaphragm is positioned on this axis approximately at the location of the entry pupil of the system formed by these three microlenses.

The three arrays of microlenses are adapted so that:
each microlens 31 of the second array images a microlens of the first array 21 onto a microlens of the third array 41;
the distance between the first array of microlenses 2 and the second array of microlenses 3 is equal to the focal length of the microlenses of the first array of microlenses 2,
the distance between the second array of microlenses 3 and said third array of microlenses 4 is equal to the focal length of the microlenses 41 of the third array of microlenses 4.

For this reason, as illustrated by FIG. 1, for any source sub-beam which is defined by the portion of the source beam coming from the integrator 1 that is intercepted by a microlens 21 of the first array and emerges from the modulable optical illumination device in the form of a sub-beam for illuminating a surface element of the integrator, this source sub-beam is refracted by this microlens 21 so that its principal axis passes through the center of the second array's microlens 31 which is associated with this microlens of the first array; thus, each microlens of the second array lies approximately at the location of the sub-pupil of the group of three associated microlenses to which this microlens of the second array belongs.

The optical relay system 6 is adapted to image each surface element of the exit section of the integrator 1, facing which there is a microlens 21 of the first array, through the three arrays of microlenses onto a different surface element of the imager 7. Referring to FIG. 3, this optical relay system 6 comprises two lenses 61, 62 centered on the principal optical axis of the illumination device. For example, the microlenses of the arrays of microlenses are configured in order to obtain source sub-beams such that F#=2.4. The union of the various surface elements of the exit section of the integrator corresponds to the total surface area of the exit section of the integrator 1. The union of the various surface elements which are thus imaged onto the imager 7 corresponds here to the total surface area to be illuminated on this imager 7.

Figure 4:
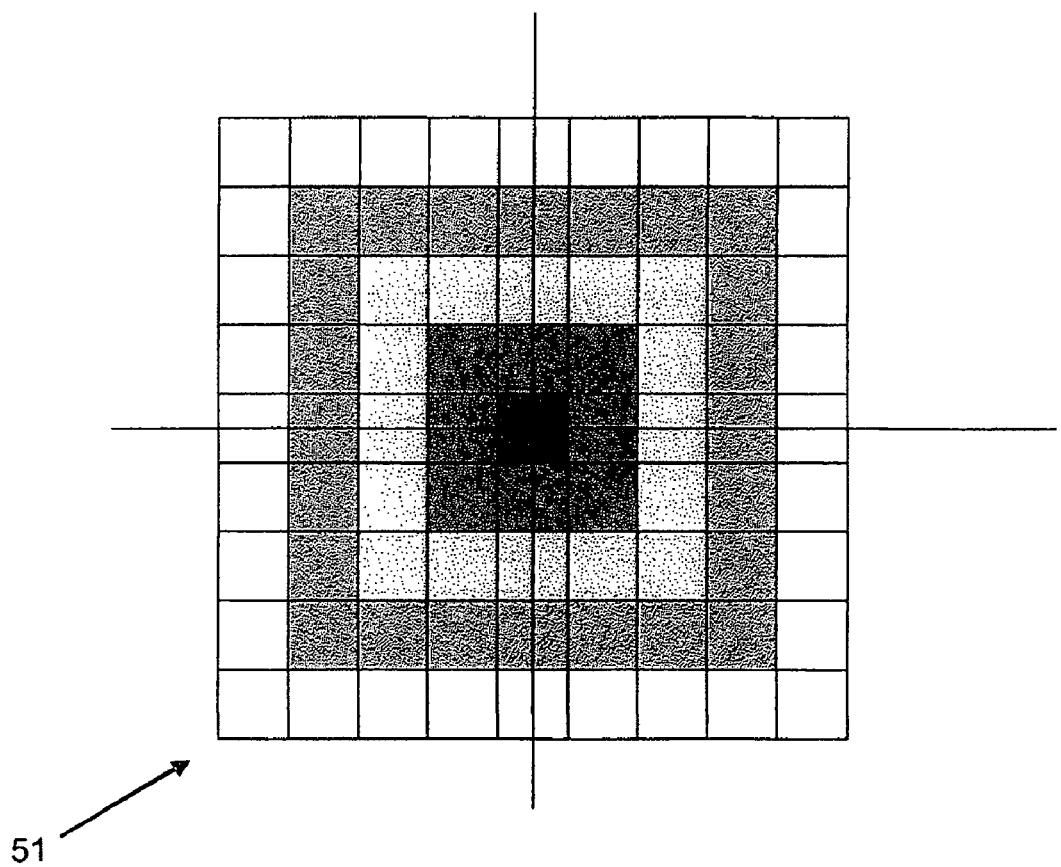
FIG. 4 illustrates a microdiaphragm of the array of microdiaphragms which is used in the illumination device of the embodiment of FIGS. 1 to 3.

In the array of microdiaphragms with a modulable aperture 5, each microdiaphragm 51 is formed by a group of liquid-crystal optical valves; referring to FIG. 4, within each microdiaphragm 51 these optical valves are distributed in a plurality of square-shaped concentric rings around a central optical valve; each microdiaphragm is formed for example by 23×23 valves (to simplify the representation, they have been limited to 9×9 in FIG. 4), which, for F#=2.4, allows aperture modulation with 8 aperture levels: 0.74, 2.22, 3.70, 5.17, 6.64, 8.09, 9.54 and 10.97; and a conventional LCD panel with 850×480 valves thus makes it possible to form an array of 720 microdiaphragms; this array is provided with control means adapted to control the opening or closing of the valves in a suitable manner in order to modulate the aperture of the microdiaphragms independently of one another.

The imager 7 comprises an array of micromirrors ("DMD") and means for controlling the orientation of each of these micromirrors; there are as many micromirrors as there are pixels in the image to be displayed; according to its orientation, a micromirror is referred to as "on" or "off"; an "on" micromirror corresponds to a lit pixel; an "off" micromirror corresponds to an extinguished pixel; each illumination sub-beam coming from the modulable optical illumination system illuminates a different surface element of this imager 7. Each surface element of the imager therefore corresponds to a group of micromirrors of the imager, which itself corresponds to a group of the pixels of the image to be displayed; taken together, the sub-beams illuminate the entire surface of the micromirrors of the imager; this surface is for example rectangular, with a 16/9 format and a diagonal equal to 2.1 cm; controlling the orientation of the set of micromirrors makes it possible to send a modulated overall beam to the objective; an image to be projected is thus generated; since the modulable optical illumination device is telecentric on the image side, all the illumination beams advantageously strike the micromirrors at identical incidence.

The projection objective is of a known type, and will not be described in detail here. It is adapted to image the illuminated surface of the imager onto the projection screen. The set of sub-beams reflected by the imager 7, each of which is spatially modulated by this imager as a function of the control of the micromirrors, is directed to the input of the projection objective so as to image the exit pupils of the modulable optical illumination device onto the entry pupil of the projection objective; good angular compatibility is thus ensured between the aperture of the modulated sub-beams and the input characteristics of the objective.

A description will now be given of an embodiment of the method for displaying images with the aid of a projection device which has just been described. Each image to be displayed is available in the form of standardized video signals, for example NTSC or EBU, and comprises one primary image for each color, red, green and blue; these video signals are converted in a manner known per se as a function of the specific characteristics of the projection device, in particular as a function of the spectral characteristics of the source and the segments of the colored wheel, so that a control datum for each micromirror of the imager is available for each pixel of each primary image; $D_R$ for a red image, $D_G$ for a green image, $D_B$ for a blue image. Each control datum generally corresponds to an activation time length of a micromirror, so that the spatial modulation of the imager is of the "PWM" type ("pulse width modulation").

On the other hand, by virtue of the illumination device, the imager 7 is illuminated by a plurality of sub-beams, each lighting a different surface element of this imager; depending on the position of the colored wheel, these sub-beams are red, green or blue in color. Each surface element of the imager corresponds to a group of micromirrors and to a corresponding group of pixels of the primary image of the illumination color.

A first step of the image display method consists in positioning the colored wheel so as to obtain a red illumination color.

A second step of the method consists in evaluating, for each group of pixels corresponding to a group of micromirrors illuminated by the same sub-beam, the maximum luminance of all these pixels, in order to deduce therefrom an aperture setpoint $M_R$ of the microdiaphragm 51 through which this sub-beam passes, and recalculate the control datum $D'_R$ of each micromirror of the imager; a recalculation criterion is based on the equivalence between, on the one hand, the display of a pixel which is obtained with a maximum aperture setpoint of this microdiaphragm 51 and a control datum $D_R$ of the micromirror corresponding to this pixel, and, on the other hand, the display of a pixel which is obtained with an aperture setpoint $M_R$ of the same microdiaphragm 51 and a control datum $D'_R$ of the same micromirror.

A third step of the method consists in generating, at the imager, an image to be projected. To this end:

the aperture of each microdiaphragm of the array of microdiaphragms is controlled as a function of an aperture setpoint $M_R$ belonging to the group of pixels and micromirrors which are illuminated by the same sub-beam passing through this microdiaphragm;

and each micromirror is addressed with its recalculated control datum $D'_R$, so as to control the orientation of all the micromirrors, send a modulated overall beam to the objective and generate a red primary image to be projected.

With the aid of the projection objective, the red primary image is subsequently displayed on the projection screen.

It may therefore be seen that each image to be projected is generated both by modulating the aperture of each illumination sub-beam and by furthermore spatially modulating the illumination of the imager, with the aid of this imager itself.

The various steps of the method are subsequently repeated for the primary color green, then for the primary color blue.

Sequential display of the red, green and blue primary images on the projection screen achieves overall final display of the image by fusion of the colors.

This procedure is carried out for each image to be displayed.

By thus distributing the modulation in two levels, that of the imager 7 and that of the array of microdiaphragms 5, the display contrast of the image is improved very substantially. Advantageously, not only aperture modulation but also luminance modulation can be carried out; it is possible to carry out either only aperture modulation of each sub-beam by fully opening or fully closing the valves of the microdiaphragm of this sub-beam, or also luminance modulation of this sub-beam by attenuation with the aid of the same valves of the microdiaphragm; with a liquid-crystal valve, 255 attenuation levels are generally available which make it possible to change gradually from full closure to full opening; the aperture of the sub-beam can be modulated by closing the peripheral valves of the microdiaphragm, and the transmission of this microdiaphragm can be modulated with the aid of its central valves; the display contrast of the images is thus improved further without adding any other component to the device.

According to a variant of the invention, the source, the mirror and the integrator are replaced by other means for obtaining a source surface of uniform emittance; for example, the use of an electroluminescent plate may be envisaged.

According to a variant of the invention, the LCD panel which forms the microdiaphragm array is also used to modulate the luminous intensity of the source sub-beams.

The present invention has been described with reference to an LCD panel for forming the array of microdiaphragms; other arrays of microdiaphragms may be used without departing from the invention.

The present invention has been described with reference to a sequential color display method; it is clear to the person skilled in the art that it may be applied to other display methods without departing from the scope of the appended claims.

The invention claimed is:

1. An illumination device for illuminating the surface of an object, comprising
    a source adapted to emit a source beam,
    a first array of microlenses intercepting said source beam and configured to partition said source beam into a plurality of illumination sub-beams, and
    a second and a third array of microlenses wherein:
    said second array of microlenses is configured so that each of its microlenses images a microlens of the first array onto a microlens of the third array, wherein these three microlenses have a common optical axis and are thereby associated,
    the distance between said first array of microlenses and said second array of microlenses is equal to the focal length of the microlenses of the first array of microlenses,
    the distance between said second array of microlenses and said third array of microlenses is equal to the focal length of the microlenses of the third array of microlenses, and
    wherein said device further comprises:
    an array of microdiaphragms with a modulable aperture, each microdiaphragm of this array being centered on the common optical axis of a group of three associated microlenses and positioned in proximity to the microlens of the second array of this group, an optical relay system which is arranged between the third array of microlenses and the object to be illuminated, and which is adapted to image each of the microlenses of the third array onto a different surface elements of said object.

2. The illumination device as claimed in claim 1, wherein, $A_S$ being the angular aperture of said source beam, L being the height of the microlenses of the second array, and f being the focal length of the microlenses of the first array, the relation $L/(2f)=\tan(A_S/2)$ is satisfied.

3. The illumination device as claimed in claim 1, wherein said source is also adapted to provide a source surface of uniform emittance, through which said source beam passes, and in that said first array of microlenses is arranged in proximity to said source surface.

4. A projection device for displaying images, comprising
    at least one imager adapted to generate images to be projected by using the illumination of its surface,
    a projection objective adapted to project said images generated by the at least one imager onto a projection screen, and
    an illumination device as claimed in claim 1, for illuminating the surface of an object, wherein said object is the said at least one imager.

5. The illumination device as claimed in claim 3, wherein said source comprises a lamp, an integrator provided with an entry section and an exit section, and an optical system adapted to image said lamp onto the entry section of said integrator.

6. The projection device as claimed in claim 4, wherein it comprises a lens adapted to image the exit pupils of said illumination device onto the entry pupil of said projection objective.

7. A method for displaying images with the aid of a projection device as claimed in claim 4, the method comprising:
    forming a plurality of sub-beams, which are adapted to illuminate different surface elements of said imager, with the aid of said illumination device,
    generating each image to be projected both by modulating an aperture of each illumination sub-beam and with the aid of this imager itself, by furthermore spatially modulating each illumination sub-beam whose aperture is modulated, and
    projecting said generated images with the aid of said projection objective.

* * * * *